(12) United States Patent
Bakircioglu et al.

(10) Patent No.: US 9,019,087 B2
(45) Date of Patent: Apr. 28, 2015

(54) SYNCHRONIZATION OF HAPTIC EFFECT DATA IN A MEDIA STREAM

(75) Inventors: Munibe M. Bakircioglu, San Jose, CA (US); Stephen D. Rank, San Jose, CA (US); Christopher J. Ullrich, Santa Cruz, CA (US)

(73) Assignee: Immersion Corporation, San Jose, CA (US)

( * ) Notice: Subject to any disclaimer, the term of this patent is extended or adjusted under 35 U.S.C. 154(b) by 1296 days.

(21) Appl. No.: 11/975,120

(22) Filed: Oct. 16, 2007

(65) Prior Publication Data

US 2009/0096632 A1   Apr. 16, 2009

(51) Int. Cl.
| | | |
|---|---|---|
| *H04B 3/36* | (2006.01) | |
| *H04N 21/2343* | (2011.01) | |
| *H04N 9/82* | (2006.01) | |
| *H04N 21/41* | (2011.01) | |
| *H04N 21/43* | (2011.01) | |
| *H04N 21/432* | (2011.01) | |
| *H04N 21/81* | (2011.01) | |
| *H04N 21/8547* | (2011.01) | |
| *H04M 1/725* | (2006.01) | |
| *H04M 19/04* | (2006.01) | |

(52) U.S. Cl.
CPC ... *H04N 21/234318* (2013.01); *H04M 1/72544* (2013.01); *H04M 1/72558* (2013.01); *H04M 19/047* (2013.01); *H04M 19/048* (2013.01); *H04N 9/8205* (2013.01); *H04N 21/4131* (2013.01); *H04N 21/4307* (2013.01); *H04N 21/4325* (2013.01); *H04N 21/81* (2013.01); *H04N 21/8547* (2013.01)

(58) Field of Classification Search
USPC ............... 340/407.1, 691.1; 463/30; 348/473
See application file for complete search history.

(56) References Cited

U.S. PATENT DOCUMENTS

| | | | |
|---|---|---|---|
| 4,334,280 A | 6/1982 | McDonald | |
| 4,768,412 A | 9/1988 | Sanderson | |
| 4,771,344 A | 9/1988 | Fallacaro et al. | |
| 5,172,092 A | 12/1992 | Nguyen et al. | |
| 5,388,992 A | 2/1995 | Franklin et al. | |
| 5,438,529 A | 8/1995 | Rosenberg et al. | |
| 5,627,936 A * | 5/1997 | Prasad et al. ................. | 386/253 |

(Continued)

FOREIGN PATENT DOCUMENTS

| | | |
|---|---|---|
| EP | 1 330 101 A1 | 7/2003 |
| JP | 2000262971 A * | 9/2000 |

(Continued)

OTHER PUBLICATIONS

Komatsu JP 2000262971 A [Machine Translated Document], Mar. 18, 2010.*

(Continued)

*Primary Examiner* — George Bugg
*Assistant Examiner* — Naomi Small
(74) *Attorney, Agent, or Firm* — Miles & Stockbridge P.C.

(57) ABSTRACT

Haptic information in a series of frames of a media file is identified and time stamps corresponding thereto are determined in accordance with information embedded in a tag either preceding or appending the media file. The haptic effect information is automatically synchronized to the media file based on the information in one or more frames of the tag, whereby an actuator outputs the defined haptic effects in the tag in a manner synchronized with corresponding audio and/or video content of the media file.

20 Claims, 9 Drawing Sheets

(56) References Cited

U.S. PATENT DOCUMENTS

| | | | |
|---|---|---|---|
| 5,675,511 A * | 10/1997 | Prasad et al. | 715/203 |
| 5,684,722 A | 11/1997 | Thorner et al. | |
| 5,816,823 A | 10/1998 | Naimark et al. | |
| 5,842,162 A | 11/1998 | Fineberg | |
| 6,160,489 A | 12/2000 | Perry et al. | |
| 6,161,126 A | 12/2000 | Wies et al. | |
| 6,285,351 B1 | 9/2001 | Chang et al. | |
| 6,292,776 B1 | 9/2001 | Chengalvarayan | |
| 6,300,936 B1 | 10/2001 | Braun et al. | |
| 6,353,173 B1 * | 3/2002 | D'Amato et al. | 84/609 |
| 6,424,356 B2 | 7/2002 | Chang et al. | |
| 6,487,421 B2 | 11/2002 | Hess et al. | |
| 6,496,115 B2 | 12/2002 | Arakawa | |
| 6,650,846 B1 | 11/2003 | Ito | |
| 6,659,773 B2 * | 12/2003 | Roy et al. | 434/55 |
| 6,703,550 B2 | 3/2004 | Chu | |
| 6,710,764 B1 | 3/2004 | Burgel et al. | |
| 6,859,819 B1 | 2/2005 | Rosenberg et al. | |
| 6,885,876 B2 | 4/2005 | Aaltonen et al. | |
| 6,963,762 B2 | 11/2005 | Kaaresoja et al. | |
| 7,061,467 B2 | 6/2006 | Rosenberg | |
| 7,065,779 B1 * | 6/2006 | Crocker et al. | 725/111 |
| 7,171,466 B2 * | 1/2007 | Van Der Meulen | 709/224 |
| 7,208,671 B2 | 4/2007 | Chu | |
| 7,233,313 B2 | 6/2007 | Levin et al. | |
| 7,283,954 B2 | 10/2007 | Crockett et al. | |
| 8,442,126 B1 * | 5/2013 | Moss et al. | 375/240.28 |
| 2002/0165720 A1 * | 11/2002 | Johnson et al. | 704/500 |
| 2003/0067440 A1 | 4/2003 | Rank | |
| 2003/0076298 A1 | 4/2003 | Rosenberg | |
| 2004/0107356 A1 * | 6/2004 | Shamoon et al. | 713/193 |
| 2004/0236541 A1 | 11/2004 | Kramer et al. | |
| 2006/0122819 A1 | 6/2006 | Carmel et al. | |
| 2006/0129719 A1 * | 6/2006 | Cruz-Hernandez et al. | 710/58 |
| 2007/0126927 A1 * | 6/2007 | Yun et al. | 348/473 |
| 2008/0136608 A1 * | 6/2008 | Guthrie et al. | 340/326 |
| 2009/0096632 A1 | 4/2009 | Ullrich et al. | |

FOREIGN PATENT DOCUMENTS

| | | |
|---|---|---|
| JP | 2004139710 A | 5/2004 |
| JP | 2006202422 A | 8/2006 |
| WO | WO 2007/047960 A2 | 4/2007 |

OTHER PUBLICATIONS

International Search Report and Written Opinion—PCT/US2008/080218.

Martin Nilsson, "ID3 Tag Editor," [Online], Feb. 3, 1999,ID3.org, XP-002544253, retrieved from the internet: URL: http://www.id3.org/id3v2.3.0> [retrieved on Sep. 4, 2009].

Chang, A. et al., "Audio-Haptic Feedback in Mobile Phones", Proceedings of ACM CHI 2005 Conference on Human Factors in Computing Systems, Apr. 2-7, 2005, Portland, Oregon, pp. 1264-1267, 2005.

Gillespie, Brent, "The Virtual Piano Action: Design and Implementation," Center for Computer Research in Music and Acoustics, 1994, 4 pages.

"VibeTonz System", Immersion Corporation, 2004, pp. 1-6.

"VibeTonz Mobile Player", Immersion Corporation, 2005, 4 pages.

"VibeTonz Solution for BREW Developers", Immersion Corporation, 2005, 2 pages.

"VibeTonz Studio SDK", Immersion Corporation, 2005, 4 pages.

Kirman, Jacob H., "Tactile Perception of Computer-Derived Formant Patterns From Voiced Speech," J. Acoust. Soc. Am., vol. 55, No. 1, Jan. 1974, pp. 163-169.

Reed, Charlotte M. et al., "Research on Tactile Communication of Speech: A Review," ASHA Monographs, No. 20, 1982, pp. 1-23.

Snibbe, Scott S., "Haptic Techniques for Media Control," In Proceeding of the 14th Annual ACM Symposium on User Interface Software and Technology, 2001, pp. 1-10.

* cited by examiner

SYNCHRONIZATION OF HAPTIC EFFECT DATA IN A MEDIA STREAM

TECHNICAL FIELD

The subject matter described herein relates to synchronizing haptic effects with audio and/or video content data in a media file.

BACKGROUND

To improve the interface between a user and a machine, incorporating haptic effects into the interface along with audio and/or video media has become more and more prevalent in recent years. Haptic effects such as vibrations can be felt by a user and may typically be related to an event trigger, such as the depressing of a key on a device or the playing of ring tones to announce an incoming call or the receipt of a text message on a cellphone, and the like. Generally, media playback can be complemented with vibrations. However, conventional methods of implementing haptic effects have some problems when playing a haptic signal along with a media signal over a period of time.

One such problem is the need to synchronize playback between haptic signals and other media signals such as video and/or audio signals. Typically, the audio engine, video engine and the haptic engine operate on different clocks. There is usually no built-in synchronization mechanism during playback of haptic, video, and audio signals. Although, for example, at the beginning of a playback, the haptic signal and the media signal may start within a few milliseconds of one another and as such are adequately synchronized, these signals can usually drift out of sync in a fairly short period of time.

Another such problem is that it can be difficult to randomly access a point in a media transport stream having both media and haptic signals. In other words, it is difficult to synchronize the haptic signals with media signals when a user begins the playback of a portion of the media transport stream at a random point without access to any data that may occur before this point in the media transport stream.

As such, what is needed is a solution that synchronizes haptic effects with other media (e.g., audio and/or video), which can operate at or from any point in a media transport stream containing both haptic and media information.

OVERVIEW

Haptic information in a series of frames of a media file is identified and time stamps corresponding thereto are determined in accordance with information embedded in a tag preceding, within or appended to the media file. The haptic effect information is synchronized to the media file based on the information in one or more frames of the tag, whereby an actuator outputs the defined haptic effects in the tag in a manner synchronized with corresponding audio and/or video content of the media file.

Additional features and benefits will become apparent from the detailed description, figures and claims set forth below.

BRIEF DESCRIPTION OF THE DRAWINGS

The accompanying drawings, which are incorporated into and constitute a part of this specification, illustrate one or more embodiments and, together with the detailed description, serve to explain the principles and implementations of the embodiments.

In the drawings.

DETAILED DESCRIPTION

Figure 1:
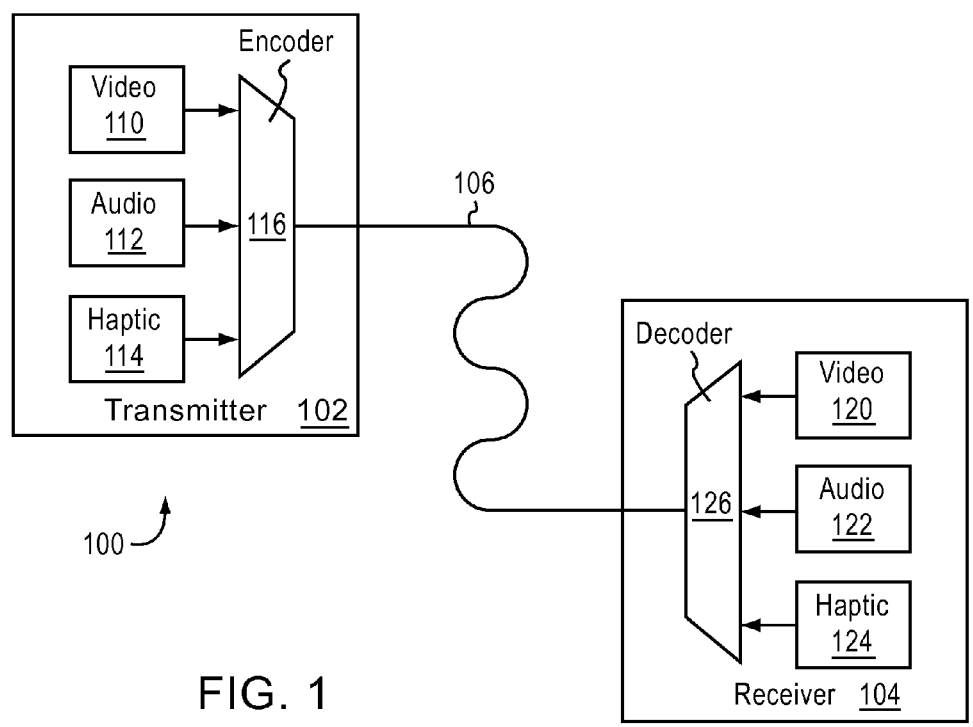
FIG. 1 is a block diagram illustrating a system for encoding, transmitting and decoding a media transport stream including haptic information in accordance with an embodiment.

Embodiments are described herein in the context of a method, system and apparatus for communicating a media transport stream including haptic information. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with this disclosure, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FP- GAs), application specific integrated circuits (ASICs), or the like, may also be used without departing from the scope and spirit of the inventive concepts disclosed herein. It is understood that the phrase "an embodiment" encompasses more than one embodiment and is thus not limited to only one embodiment. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card, paper tape and the like) and other types of program memory.

In an embodiment, the system is directed to synchronizing haptic effect tracks with other media tracks contained in a multi-track media transport stream to generate synchronized multimedia effects. In an embodiment, the system utilizes synchronization data in a header of a media file to ensure that the haptic effects are synchronized with the media content in the file. These embodiments will be described separately to ensure clarity, but it should be noted that the system and its components are common to all embodiments and the described details of the specification apply to all embodiments.

In general, an embodiment is directed to a system which receives multi track data streams of media data with haptic data at an end unit or device, whereby haptic information in a series of frames in the stream is identified. Additionally, time stamps corresponding thereto are determined in accordance with a master time code signal embedded in the media transport stream. Each media transport stream frame containing haptic information is assigned a time stamp so that it will be used to activate an actuator at a proper time responsive to the time stamp to generate a haptic effect in accordance with the haptic information. The time stamps allow the haptic frames to be synchronized with the audio and/or video data in the media stream so that the haptic effects are felt at the appropriate times with respect to the media data.

FIG. 1 is a block diagram illustrating a system 100 for encoding, transmitting and decoding a media transport file that is streamed in accordance with an embodiment. System 100 includes a transmitter 102, a receiver 104, and a communications medium 106. Transmitter 102, in an example, is a mobile phone, personal digital assistant ("PDA"), personal computer ("PC"), server, home entertainment center, digital camera, or any other digital processing device that is capable of transmitting media files over a wired or wireless land or cellular network. It should be noted that, in an embodiment, the media stream is stored on a tangible media, such as a DVD, CD, CDROM, hard drive, flash drive, RAM, or other storage device, whereby the data is retrieved by the receiver 104 from the stored information.

The media frames include, but are not limited to, video, audio, and/or haptic frames. It should be noted as well as that video and/or audio frames may be included in the media stream, and is not necessarily limited to both types of content being embedded in the media stream. As discussed below, in an embodiment, the system is able to utilize haptic event data which is written in the tag of an audio file (e.g. MP3), whereby the end unit is able to output haptic feedback upon reading the tag of the received audio file. In another embodiment, the system is able to utilize haptic event data which is written in the tag of an audio and video file (e.g. MP4), whereby the end unit is able to output haptic feedback upon reading the tag of the received file.

In the embodiment, shown in FIG. 1, the audio, video and haptic data are streamed individually from the transmitter 102 to the receiver 104. As shown in FIG. 1, the transmitter 102, in an embodiment, includes an encoder 116, a video block 110, an audio block 112, and a haptic block 114. In an embodiment, the transmitter 102 does not include a video block 110, but only an audio block 112 and the haptic block 114. Video block 110 sources a series of video frames and audio block 112 sources a series of audio frames. Haptic block 114 sources a series of haptic frames. In an embodiment the video and/or audio blocks are sourced from one location whereas the haptic frames are sourced from another location. In another embodiment, all the audio/video as well as haptic frames are sourced from one location.

In an embodiment, the encoder 116, for an example, is capable of encoding or generating video frames from video block 110, audio frames from audio block 112, and haptic frames from haptic block 114 and integrating them into a media transport stream in accordance with, for example, a commercially available media transport protocol such as Moving Picture Experts Group Compression Standard Version 4 ("MPEG-4"), MP3 (audio only), or the like. In other words, video frames and/or audio frames as well as haptic frames are encoded or packaged into a media transport stream, and that media transport stream is subsequently transmitted to a user-designated destination or end unit over a communications medium 106. Although one encoder is shown for all the blocks, it is contemplated that each block or one or more blocks is coupled to a respective encoder. It should be noted that integrating timed haptic information into various frames can apply to any media transport stream format and is not limited to a particular file type, protocol, software environment, or media player hardware environment.

The media transport stream is series of data packets which are transmitted from the transmitter 102 and are received serially by the receiver 104, whereby the data packets are not necessarily stored in the receiving end. An example of this is typical internet streaming of video and/or audio from a remote server. In another embodiment, the haptic signal transported by the media transport stream is compressed or encrypted to enhance the data security.

Communications medium 106 can be a line (or wire) communications medium, a wireless communications medium, or a hybrid wire and wireless communications medium. The video frames from video block 110 and audio frames from audio block 112 form, respectively, a video component and an audio component, or collectively a media component of the media transport stream. The haptic frames form a haptic component of the media transport stream.

Receiver 104 is capable of receiving the media transport stream over the communications medium 106. The receiver 104 or end unit, in an example, is a mobile phone, personal digital assistant ("PDA"), personal computer ("PC"), server, microphone, home entertainment center, or any other digital processing device that is capable of receiving media files over a wired or wireless network and outputting haptic feedback. Receiver 104 includes one or more decoders 126, a video block 120, an audio block 122, and a haptic block 124, in an embodiment. Video block 120, audio block 122, and haptic block 124, in an embodiment, are used to store video frames, audio frames, and haptic frames, respectively. Again, in an embodiment, the receiver 104 does not include a video block 120, but only an audio block 122 and the haptic block 124.

Upon receipt of the media transport stream, receiver 104 parses video frames, audio frames, and haptic frames from the media transport stream and sends video frames to video block 120, audio frames to audio block 122, and haptic frames to haptic block 124. It should be noted that video frames in video block 110, audio frames in audio block 112, and haptic frames in haptic block 114 contain substantially similar information to video frames in video block 120, audio frames in audio block 122, and haptic frames in haptic block 124, respectively. It should be further noted that video frames in video block 110, audio frames in audio block 112, and haptic frames in haptic block 114 may have, where appropriate, different data formats from corresponding video frames in video block 120, audio frames in audio block 122, and haptic frames in haptic block 124 although they may contain similar information. It should be noted that although one decoder is shown in FIG. 1, it is contemplated that each block may be coupled to its own respective decoder or share a decoder with another block. It should be noted that integrating timed haptic information into various frames can apply to any media transport stream format and is not limited to a particular file type, protocol, software environment, or media player hardware environment. It should also be noted that transmitter 102 and receiver 104 may be similar devices that both contain similar capabilities for transmitting and receiving.

Figure 2:
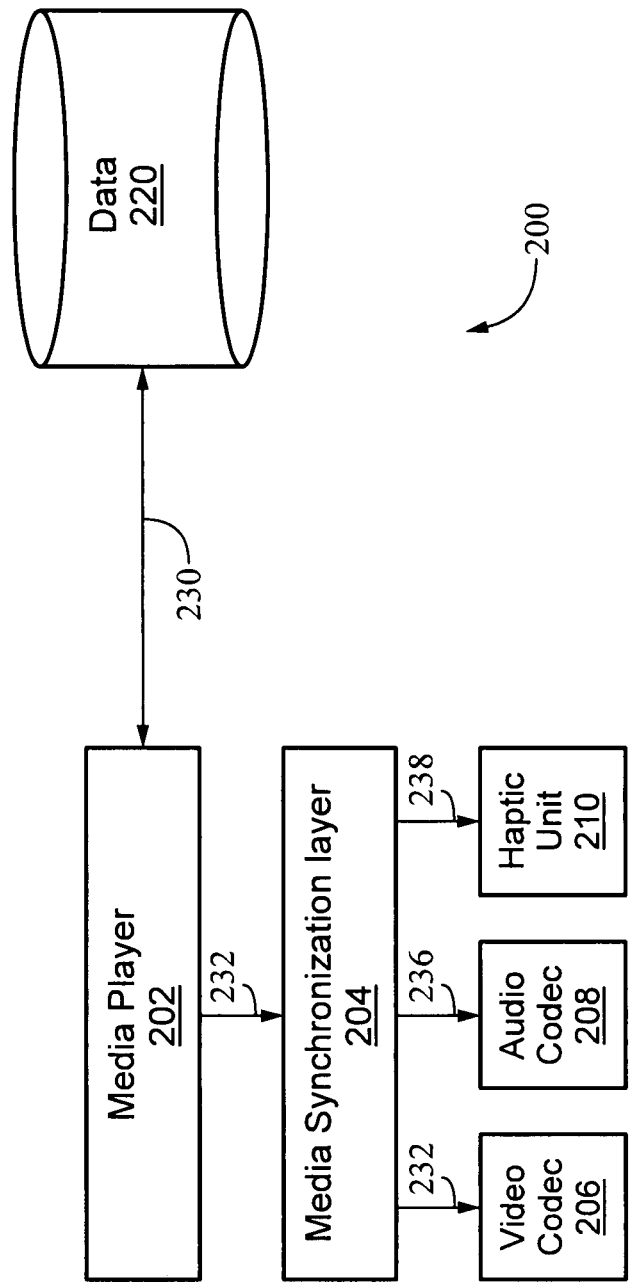
FIG. 2 is a block diagram illustrating a system for identifying media and haptic component from a media transport stream in accordance with an embodiment.

FIG. 2 is a block diagram illustrating a portion of the receiving system 200 for identifying media components and haptic components of a media transport stream in accordance with an embodiment. System 200 includes a media player 202, a media synchronization (sync) layer 204, and a database or memory storage 220. Bus 230 is used to transport data between media player 202 and database 220, and bus 232 is used to pass information between media player 202 and media sync layer 204. The media sync layer 204 is further coupled to a video codec 206 and/or audio codec 208, and a haptic unit 210 via respective buses 234-238. Video codec 206 and audio codec 208 can be software modules, hardware devices, or a combination of hardware and software components for compressing and decompressing digital information. In an embodiment, the device 200 is the end unit itself (e.g. mobile phone). In another embodiment, the device 200 is stored on a remote server or other component, whereby the device 200 acts as an intermediate node between the source providing the media stream and the end unit.

In an embodiment, a set of frames including the video and/or audio as well as haptic information and master time code for the entire timeline is transmitted to the system 200, whereby the data stream is at least temporarily stored or buffered in memory 220. The media player 202 receives the stored data from the memory 220 and extracts the audio and/or video data and haptic data or frames which were transmitted in the media transport stream. The media player 202 can be programmed to handle a specific media transport stream format or multiple predefined streams and extensions, such as MP3, MP4, AAC, Ogg Vorbis, asx, etc.

Upon the media data and haptic data being extracted by the media layer 202, the media sync layer 204 receives the content and synchronizes the extracted media content by delivering frames of each media type to the appropriate codec at a time specified by a master time code or a timing table received in the media transport stream. Media sync layer 204 reads time stamps or the initial time to each haptic frame. These time stamps are compared with the master time code and used to send haptic effect timing and definitions to the haptic unit 210 to activate an actuator (or multiple actuators) at the proper time. Each haptic frame is assigned with an initial time or a time stamp 520 at which associated haptic effect(s) should be played at a proper time according to a master time code 510 by the media player. In an embodiment, time stamps 520 are not assigned to frames that do not contain the haptic information. For example, the data (base) omits a frame if it does not contain haptic information. In an embodiment, time stamps associated with the haptic information are generated in accordance with predefined algorithms based on the other media components. In another embodiment, time stamps associated with the haptic information can be generated according to a combination inputs from a user and predefined algorithms in view of other media components.

Figure 3:
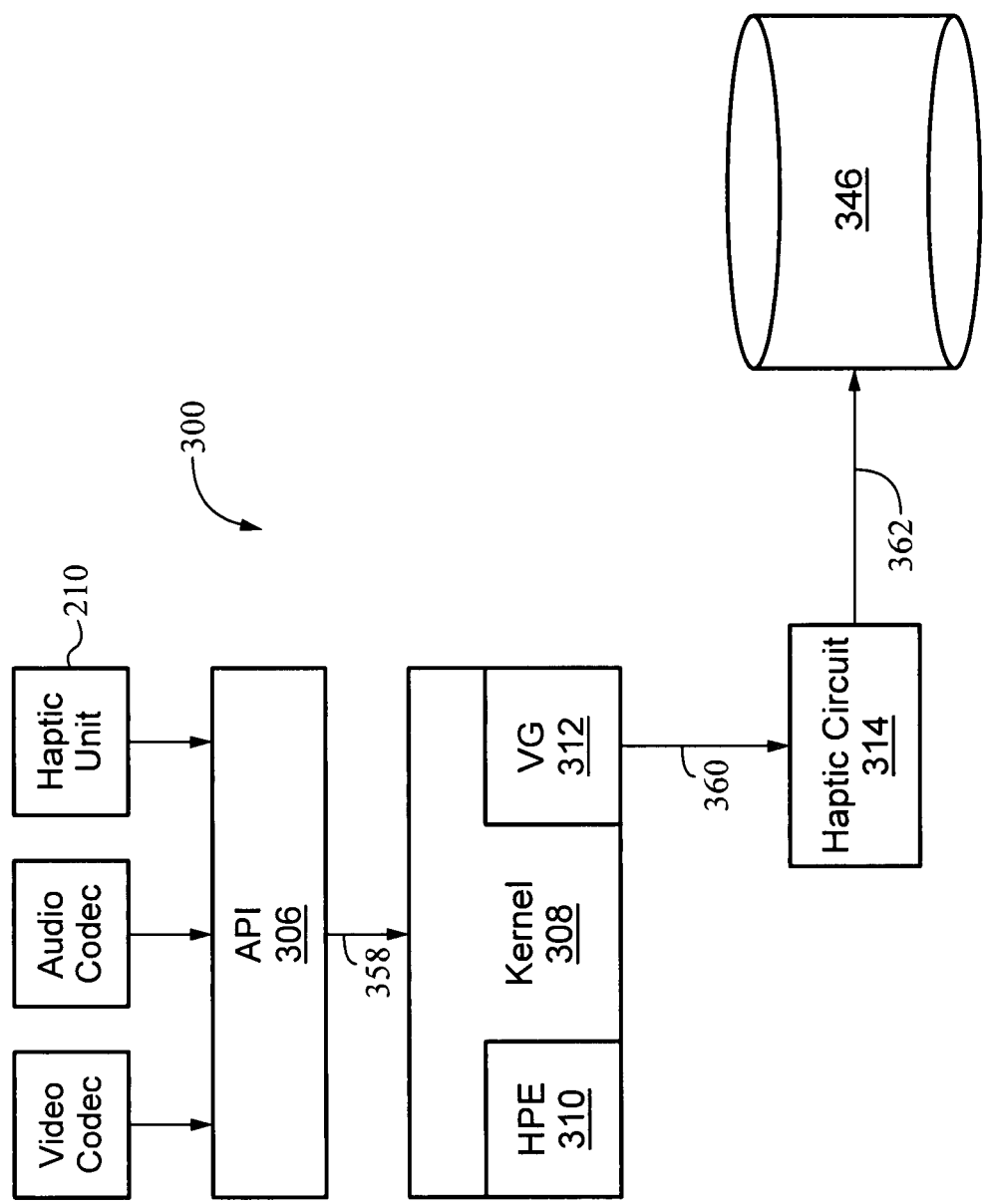
FIG. 3 is a block diagram illustrating a device for synchronizing haptic component with the other media components in accordance with an embodiment.

FIG. 3 is a block diagram illustrating another portion of the system 200 in accordance with an embodiment. The device 300 shown in FIG. 3 is preferably part of the media synchronization layer 202 in the end unit 104 and ensures that the physical haptic effect associated with the time stamped haptic component corresponds with the media components. In an embodiment, the device 300 separate from the portion 200 in FIG. 2. In an embodiment, the device 300 is hardware based and software based. In an embodiment, the device 300 includes an Application Programming Interface ("API") 306, a Kernel 308, and a haptic circuit 314. Kernel 308 is shown to further include a vibe generator ("VG") 312, a haptic playback engine ("HPE") 310. Although the vibe generator 312 and the haptic playback engine 310 are shown to be a part of the kernel 308 is contemplated that the vibe generator 312 and the haptic playback engine 310 are separate modules from the kernel 308. In addition, the portion 300 includes one or more actuators which are coupled to the haptic circuit 314. It is contemplated that any type of actuator 346 may be used in the system. It should be noted that although device 300 is shown to include the above components, additional and/or alternative components are contemplated.

The API 306 communicates with the kernel 30825 low level commands which eventually serve to operate the actuator 346 in a manner consistent with the haptic information defined in the frames. In an embodiment, HPE 310 schedules in the haptic events in accordance with data received from the haptic unit 210 via API 306 via bus 358. The VG 312 synthesizes the haptic effects according to the haptic information received from API 306 and provides control signals to the haptic circuit 314 which are used to operate the actuator 346. Kernel 308 is further coupled to haptic circuit 314 via connection 360. Haptic circuit 314, in an example, is an amplifier configured to drive actuator 346 via connection 362. The haptic circuit 314 may be an analog or digital electrical circuit and/or may be software based.

A function of API 306 is to initiate haptic effects at the correct time with regard to the corresponding audio and/or video data. This is due to each haptic frame being a self-contained haptic effect which does not rely on other haptic frames which precede or succeed it. An advantage of having a self-contained haptic frame is that it permits a user to randomly access a haptic frame or a media frame when using the device 300 and ensure that the system will still be able to generate a synchronized multimedia output including image, sound, and haptic effects. This is discussed in more detail below.

Figure 4:
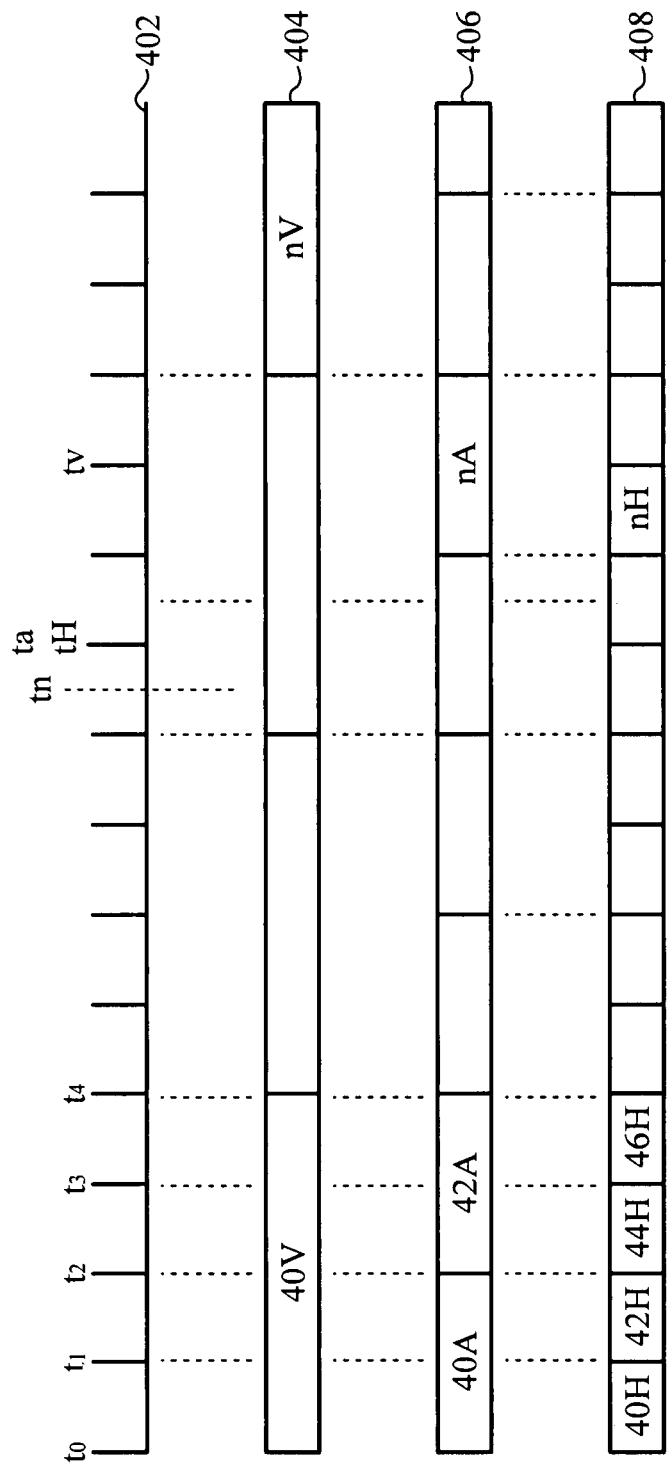
FIG. 4 is a timing diagram illustrating a method of synchronizing the playback of video, audio and haptic signals in accordance with an embodiment.

FIG. 4 is a timing diagram 400 illustrating a method of synchronizing the playback of video, audio and haptic signals in accordance with an embodiment. Timing diagram 400 illustrates a master time code 402 embedded in the media transport stream, a video component 404 of the media transport stream, an audio component 406 of the media transport stream, and a haptic component 408 of the media transport stream. Master time code 402 is embedded in and can be extracted from the media transport stream by the media player. In an embodiment, master time code 402 is a timeline with a series of time stamps such as $t_0, t_1, t_2$, and so on which is independent of the audio and/or video data. However, it is contemplated that the audio and/or video component in the media file include timestamps may be used as the master time code 402.

Video component 404 in FIG. 4 includes a plurality of sequential video frames such as frames 40V . . . nV. Audio component 406 includes a plurality of sequential audio frames such as frames 40A, 42A . . . nA. Haptic component 408 also includes a plurality of sequential haptic frames such as frames 40H, 42H, 44H, 46H . . . nH. It should be noted that the "n" is an integer value. As shown in FIG. 4, the video component 404, the audio component 406, and the haptic component 408 are all synchronized with the master time code 402. In particular, video frame of 40V spans from time $t_0$ to $t_4$. In comparison, audio frames 40A and 42A are present in the stream from time stamps $t_0$ to $t_4$. Additionally, the haptic frames 40H, 42H, 44H, and 46H are present in the stream from time stamps $t_0$ to $t_4$.

While the frame formats may be different between the video, audio and haptic frames, the frames within the component will be configured in accordance with a common protocol. In an embodiment, the haptic frame 40H is substantially the same size in data as the haptic frame 42H. In another embodiment, the time span covered by 40H and 42H are, for example, 200 ms each, but their physical memory footprints may be different. It is contemplated that other time spans besides 200 ms are contemplated. It should be noted that the haptic frame sizes, in an embodiment, are determined by the length of time as opposed to physical data capacity. It should be noted that although the audio frames 406 are shown to have equal lengths the audio frames may have differing lengths. The same is also applicable to video and the haptic frames.

Referring back to FIG. 4, at time stamp to, haptic frame 40H, audio frame 40A and video frame 40V begin playback at substantially the same time. Although haptic frame 40H finishes playing at time stamp $t_1$, the haptic effects defined in haptic frame 40H may be configured to continue playing beyond time $t_1$. For example, the haptic effect in frame 40H may be a vibration which is longer in time than the length than the time between $t_0$ and $t_1$. If this occurs, one or more actuators continue to output the earlier haptic effect while outputting the following haptic effect in an overlapping manner.

At time stamp $t_1$, haptic frame 42H begins to be output. It should be noted that the initial time or time stamp at which haptic frame 42H is played corresponds to a time determined from the master time code. Assigning a time stamp to the haptic frame allows the haptic frame (e.g. frame 42H) to begin playback independent from the time at which the preceding haptic frame, such as frame 40H, is finished playing. Thus, if haptic frame 40H has finished playing prior to time stamp $t_1$, no haptic effects will be played until haptic frame 42H is played at time stamp $t_1$. At time stamp $t_2$, haptic frame 44H and audio frame 42A will be played. At time stamp $t_3$, haptic frame 46H will be output although the video frame 40V and audio frame 42A will be playing.

Encoding time stamps to the content data 404-408 enables the user to access a particular piece of the content at any point in the time line and still experience the synchronized haptic effect that is associated with the selected content. Thus, upon the user selecting the audio frame nA, the system would automatically play the associate haptic effect nH which corresponds to the audio frame nA. This would be advantageous in situations where the user forwards the file to hear a particular audio note (e.g. bass drum) or see a particular video image (e.g. explosion), whereby the system plays the haptic effect (e.g. a jolt) that is assigned to that particular content frame.

In an embodiment, if the user were to fast forward to time $t_n$ in FIG. 4, the system would wait until time $t_H$ before playing the next haptic frame nH. Prior to that, no haptic effects would be played in that embodiment. Similarly, the player would wait until $t_A$ which in this instance is equivalent to $t_H$, before playing the next audio frame nA. Similarly, the player would wait until $t_v$ to play the next video frame nV.

In an embodiment, the device allows the media sync layer 204 to specify playback to begin at exactly time $t_n$, in which case media sync layer 204 transmits haptic frame (n−1)H and specifies a time offset of tn-(t−1)H to Haptic Unit 210. Haptic Unit 210 then communicates this time offset to API 306 when attempting to playback the frame (n−1)H. It is contemplated that the system could be configured to play one or more immediately preceding haptic frames (or a portion thereof) to the selected frame by storing a set number of frames in a buffer whereby the user is able to experience the haptic effect or a portion of the haptic effect at the exact point of playback.

In an embodiment, a haptic frame is configured to contain one or more haptic effects defined therein. The parameters that define and schedule these haptic effects are provided in the haptic frame, whereby the system interprets the haptic parameters and instructs the actuator to play the haptic effect from the defined parameters. For example, the defined parameter are capable of causing the player to offset more than one haptic effect to be played back within a frame. In other words, the time offset between the haptic effects is relative to the start of the particular frame that their parameters are defined in and not the start of the file or media transport stream. Scheduling individual effects within a frame is the responsibility of the device playing the sounds, images, and haptic effects. For instance, the type of media player, network connection, type of actuator, and/or size of device may dictate how the haptic effect should be scheduled based on the particulars of the end device. Since the sync layer of the device schedules playback of video, audio, and haptic frames, any drift between the different media can be corrected at the start of each frame instead of at the beginning of the entire file or stream.

Figure 5:
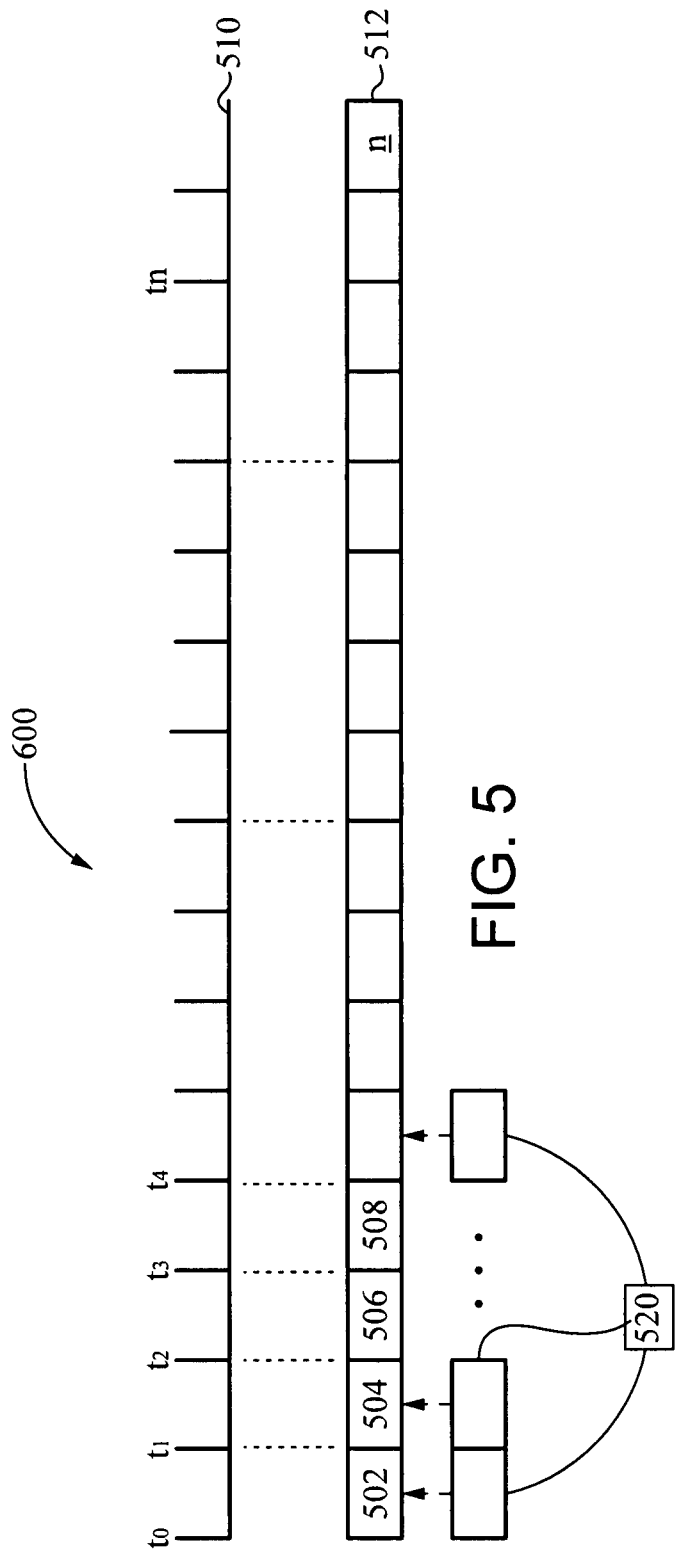
FIG. 5 is a diagram illustrating a haptic signal parsed into successive frames in accordance with an embodiment.

FIG. 5 is a diagram 500 illustrating a haptic effect parsed over a series of successive frames in accordance with an embodiment. Diagram 500 includes a master time code 510 and a haptic component 512 which is synchronized with the master time code 510. Haptic component 512 further includes multiple haptic frames 502, 504, 506, etc. Each haptic frame represents and occupies a fixed length of time and packages multiple haptic effects associated with that fixed length of time. The timeline and time stamps such as $t_0$ and $t_1$ are determined by the master time code 510.

In an embodiment, the master time code 510 is used by the device to coordinate the reception and playback of all frames or data packets it receives for a file. In an embodiment, the frame length in time can be selected and fixed during normal operation by the user. In an embodiment, a range of frame length between 100 to 300 ms (milliseconds) is used depending on the nature of the data and user's preferences. In some special operations, a 1 ms frame length may be used to meet some extremely tight synchronization requirements. It should be noted that the cost associated with an 1 ms frame length can be high because it requires a significantly increased bandwidth usage. In an embodiment, the frame lengths of the master time code is set and embedded in the file, and thus is not able to be changed by the user or the device 300. It should be noted that frame lengths are contemplated and are not limited to those values described above.

Generally, a longer frame length means less frames need to be synchronized with media effects, which implies a greater chance to cause the haptic effects to be out of synchronization with the audio and/or video. On the other hand, although a shorter frame length provides a better and tighter synchronization with the audio and/or video, it requires more processing power and higher network bandwidth to handle the increased sync process between the haptic and media effects.

The size of a haptic frame, in an embodiment, can be 8, 16, 25, 32, 64, 128 or 256 bytes depending on the complexity of the haptic effect. For example, some haptic frames include vibration-sound and/or vibration-video data correlated to specific sounds and/or video frames, respectively. In an embodiment, a haptic frame contains information required to render at least one haptic effect and a time stamp indicating the starting time of the haptic effect. It should be noted that a haptic frame may be omitted if haptic information is not present in a frame.

Figure 6:
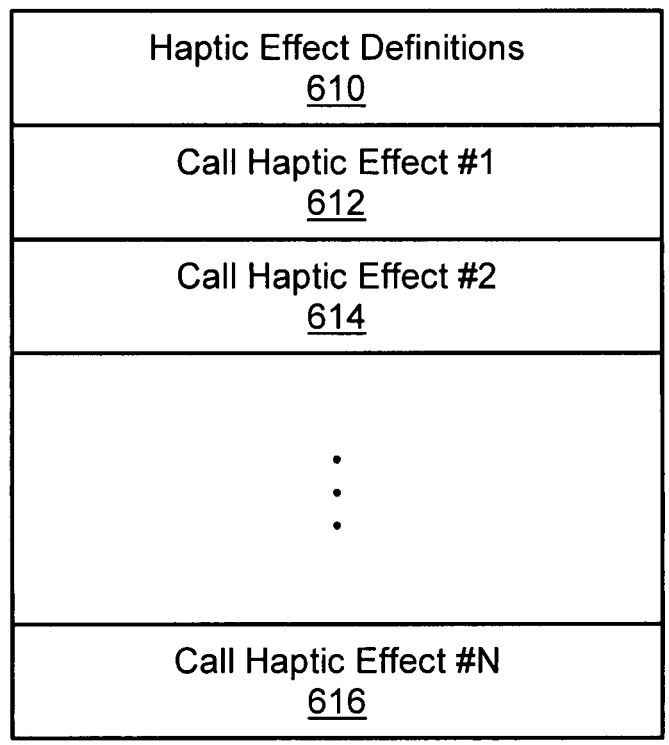
FIG. 6 is a block diagram illustrating a haptic frame containing haptic information in accordance with an embodiment.

FIG. 6 is a block diagram illustrating a haptic frame 600 containing haptic information in accordance with an embodiment. In an embodiment, haptic information is used to define each haptic effect to be played within a frame. Haptic information includes various parameters, such as intensity/magnitude, duration, periodicity, start-delay, attack intensity, attack timing, fade intensity, fade timing, and the like, which are necessary to implement a haptic effect or a series of haptic effects during the duration of a frame length. A duration parameter is used to specify how long the haptic effect is to be played by the actuator. The start-delay parameter of a haptic effect indicates how long the haptic effect will wait to be played from the start of a frame or time stamp. In an example, haptic effects can be periodic and the periodicity parameters define such periodicity. In an embodiment, the haptic effect information uses a non-parametric encoding. Such an encoding, in an embodiment, can include a series of 8-bit actuator control values to be applied to a pulse width modulator that controls the instantaneous voltage applied across the actuator leads for a duration of 5 ms per 8-bit value. If every haptic frame represents 200 ms of haptic playback time, then every haptic frame would contain exactly 40 bytes of data. Haptic information may also include envelope information, which is used to control haptic effects by setting boundaries for some haptic effects.

Haptic frame 600 shown in FIG. 6 is an exemplary layout of a haptic frame which contains a haptic effect definitions portion 610 and a series of call haptic effect instructions 612-616. In an embodiment, haptic effect definition 610 includes controlling information such as the duration parameters, stop time, start time, and the start-delay parameters. Each call haptic effect 612-616 may contain information about magnitude, attack intensity, fade intensity, and specific type of haptic effect which will be played. Thus, each haptic frame 600 provides the start and stop times which correspond with the assigned time stamps and also holds information as to what type of haptic effect(s) are to be output by the actuator. It should be noted that the haptic frame is capable of initiating one or more haptic effects at the same time. It should be further noted that the haptic effect may continue playing beyond the frame length or time span of the haptic frame. In an embodiment, the haptic effect definition 610 portion may specify that the haptic effect is to be played a time offset by indicating an offset parameter that controls how far into the frame the haptic effect commences (e.g. start vibration 5 ms after time stamp).

Figure 7:
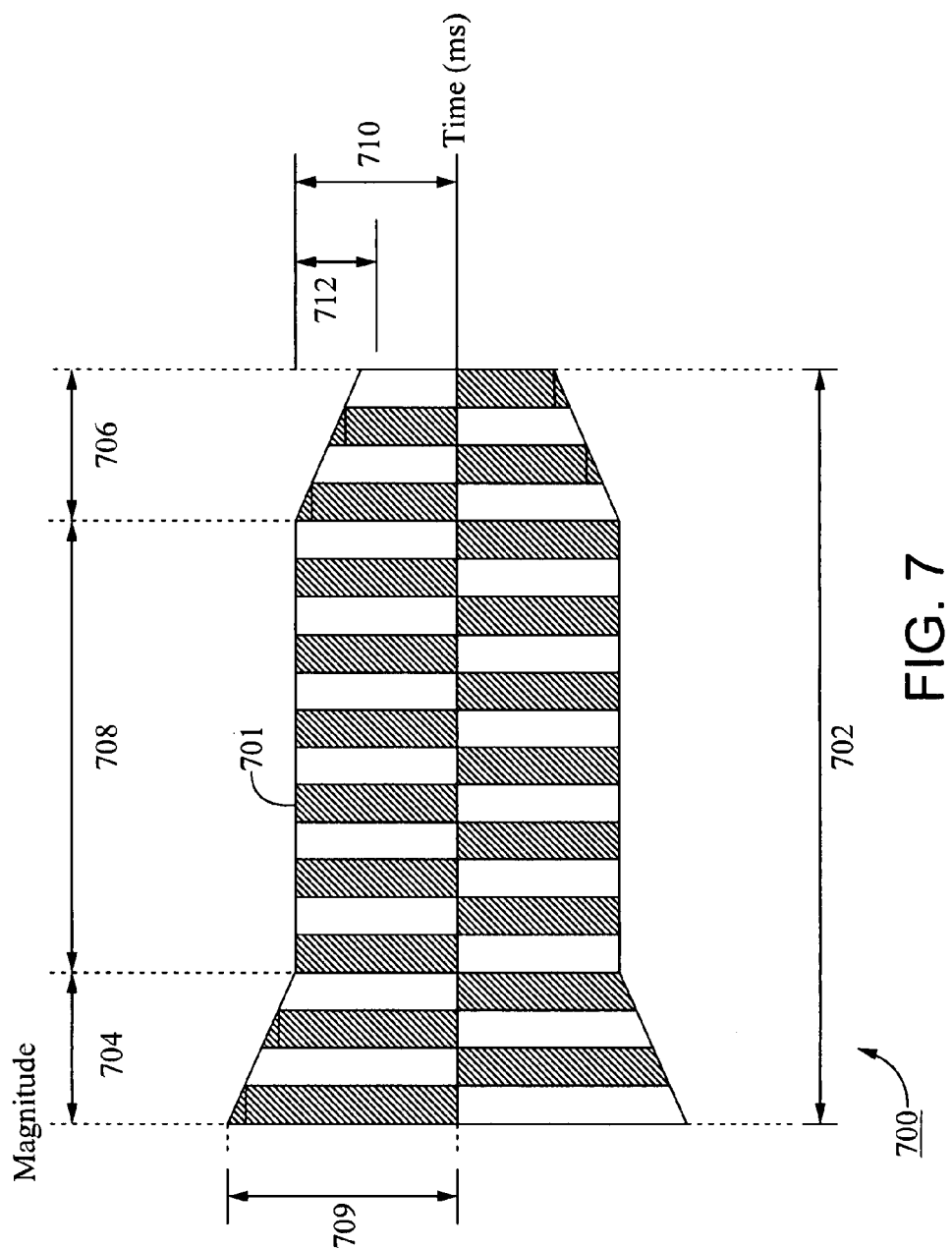
FIG. 7 is a diagram illustrating a waveform causing haptic effects in accordance with an embodiment.

FIG. 7 is a diagram 700 illustrating a waveform 701 associated with a haptic effect in accordance with an embodiment. In particular, the x-axis represents time whereas the y-axis represents magnitude or intensity of the force to be output by the actuator. The waveform 701 causes a haptic sensation to be felt by the user using several different frequencies. The haptic effects of waveform 701 last for a duration of time shown as 702 during which there is an attack time 704, a normal time 708 and a fade time 706. In an embodiment, the duration 702 is equal to or less than the time span of the haptic frame. In another embodiment, the duration 702 is longer than the time span of the haptic frame. The intensity of the haptic effect at its start is specified by an "attack level" 709. The intensity of the haptic effect changes to a "magnitude" level 710 by the start of the normal time 708 and it changes to the fade level 712 at the end of the fade time 706. Alternatively, fade level 712 can also be measured from zero magnitude haptic effect. It should be noted that the waveform shown in the FIG. is an example and several different types of known waveforms are contemplated.

A frequency period or periodic type can be constant force, square wave, triangle wave, sine wave, saw tooth wave, inverted saw tooth wave, or any combination of the above-stated waveforms. It should be noted that a different frequency period provides different haptic feedback. For example, waveform 701 could be in a range from 0.1 Hertz to 1000 Hertz wherein different frequencies provide different haptic sensations.

In operation, the haptic effect caused by waveform 701 is defined in terms of its attack level 709, attack time 704, fade level 712 and fade time 706. When it is time to execute waveform 701, the execution process specifies the base intensity or "magnitude" of the haptic effect, its duration, whether it is to be played periodically, and if so, how often it is to be re-started. The information defining the haptic effects is present in every haptic frame and is serially downloaded to the playing device when the haptic and content data are separately stream as in the embodiment in FIGS. 1-3. In another embodiment discussed below, the haptic effects are stored in a frame in the file header of the content file. It should be noted that waveform 701 is only an example and those of ordinary skill in the art will readily understand that such haptic effects may be defined in any number of ways.

For the embodiment described in FIGS. 1-3, the system utilizes various processing steps to synchronize incoming streams of haptic frames with the content frames. The steps described herein may be embodied in machine or computer executable instructions. These instructions, in turn, may be used to cause a general purpose or special purpose system, which is programmed with these instructions to perform the steps described herein. Alternatively, the steps described herein may be performed by specific hardware components that contain hard-wired logic for performing the steps, or by any combination of programmed computer components and custom hardware components. While embodiments will be described with reference to a wireless communications network, the method and apparatus described herein is equally applicable to other network infrastructures or other data communications environments including wired.

Figure 8:
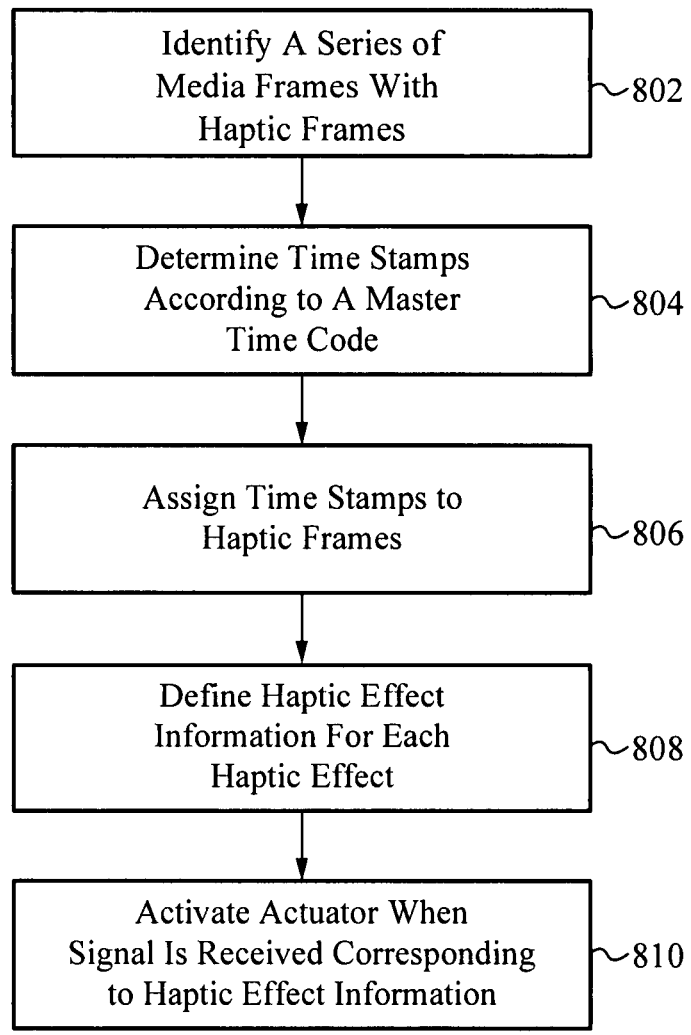
FIG. 8 is a flow chart illustrating a process for synchronizing haptic effects with the media component in accordance with an embodiment.

FIG. 8 is a flow chart illustrating a process for synchronizing haptic effects with other media components in accordance with an embodiment. At block 802, the process identifies haptic information in at least one haptic frame in a media transport stream. In an embodiment, the system identifies a series of video, audio, and haptic frames while they are being received. This is performed by the media player in an embodiment.

At block 804, the system determines the time stamps to assign to the frames according to a master time code. As stated above, the master time code may be embedded in the media transport stream, in an embodiment. In an embodiment, the time codes associated with the video and/or audio streams may be used as the master time code. As stated above, time stamps are points of time which the system uses to trigger execution of the haptic effects defined in the haptic frames.

At block 806, the system assigns time stamps to the haptic frames wherein the time stamps indicate when to activate one or more actuators to generate haptic effects according to the haptic information stored in the haptic frames. It is preferred that the time stamps assigned to the haptic frames are synchronized and aligned with the corresponding audio and/or video frame. Also, the system is capable of assigning sub-time stamps that are an offset of the time stamp within a single haptic frame, as discussed above. In an embodiment, blocks 804-806 are performed at the time of design the haptic effects into the media file.

At block 808, the process interprets the haptic effect information stored in each haptic frame to determine the type of haptic effect to be output for the particular frame. In an embodiment, the system encodes the haptic effect information in response to the video and/or audio signals. In another embodiment, the process encodes the haptic effect information in response to one of several predefined algorithms. It should be noted that each haptic frame can contain multiple haptic effects starting at different times within the particular haptic frame. It should be further noted that the system is capable of activating the one or more actuators according to the haptic effect information, and also maintaining the haptic effect according to its associated time stamp.

As stated above, the system is configured to receive multiple streams of media data and haptic data, whereby of the system assigns time stamps to the haptic frames to and synchronize the haptic frames to the immediate data streams to produce a cohesive-haptic experience. In another embodiment, the system is able to output haptic effects from haptic information that is embedded in header tags in the media transport file whereby the haptic effects are synchronized with the audio and/or video in the file. In particular, the system can be configured to take advantage of existing tagging schemes, one example being the ID3V2 tagging scheme, which are embedded in the media transport file. The system is able to interpret stored haptic information as well as synchronize the haptic information with the other media information in the file from reading the header tags which preferably precede the data in the file. The specification uses the ID3V2 tagging scheme to describe the inventive embodiments, but it should be noted that other tagging schemes and solutions (e.g. ID3V1, Lyrics3) are contemplated.

Figure 9:
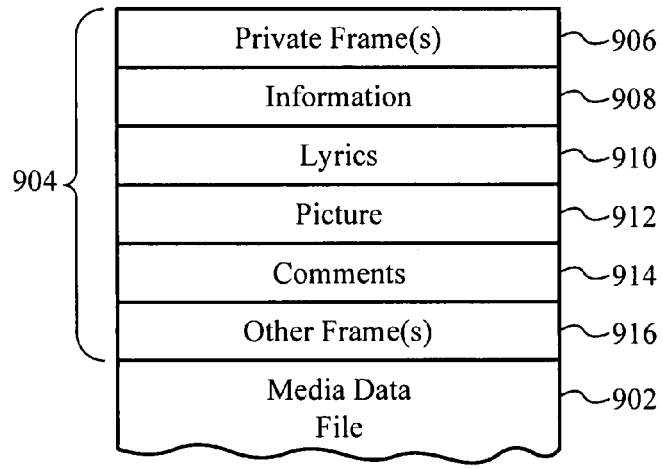
FIG. 9 is a diagram illustrating a tagging scheme of a file for use with the system in accordance with an embodiment.

In general, the tagging scheme uses a tag, which is a chunk of data that is prepended to the media file, whereby the tag holds one or more smaller chunks of frames. As shown in FIG. 9, the tag can include any type of information, such as title, album, performer, website, lyric, equalizer presets, pictures, etc. In an embodiment, each frame can be 16 MB and the entire tag can be 256 MB, although the frame sizes are not limited to these values. In an embodiment, the tag is in a container format (e.g. IFF, PNG extensions) which allow new frames to be added. In addition, the placement of the tag in front of or before the content data allows the system to utilize the tag and its embedded information when the file is streamed to the end unit. In an embodiment, the tag is located after the content data, whereby the system is able to effectively render synchronized haptic effects from the tag data.

In an embodiment, the tag is embedded with the haptic information directly therein by a programmer or administrator using a software program. The embedded tag along with the corresponding media file 902 is sent to the receiving end unit 104 (FIG. 1) or a server or other storage means for later downloading to the receiving end unit 104. In an embodiment, the relevant portions of the tag or the tag itself which includes the haptic information and synchronization information is stored on a remote database similar to Gracenote's Compact Disc DataBase CDDB which is then delivered to the receiving end device 104 upon request from the end device 104. In an embodiment, the end device 104 may combine the information from the received header frame with the content data stored on the end device 104, whereby the combination is processed and output by the end device to produce haptic effects which are synchronized with the media data.

FIG. 9 illustrates a schematic of a tag of a media file in accordance with an embodiment. The media file 900 in FIG. 9 includes the media content data 902 which includes audio and/or video data. Shown attached to the front of the media data file 902 is, in an embodiment, a header tag 904, whereby the header tag 904 may include a private frame 906, an information frame 908, a lyrics frame 910, a picture frame 912, a comments frame 914, and well as any other additional frames 916 desired to be inserted by the programmer. It should be noted that the tag is not limited to the frames shown and additional and/or alternative frames are contemplated to be used with the media file 900. In addition, it is contemplated that more than one of a particular frame may be present in the header tag 904 (e.g. two lyrics frames 910, two picture frames 912, etc.). Although the tag is primarily discussed herein as preceding the audio/video data, it is contemplated that the tag may be placed after the audio/video data or within or between packets of audio and video data.

The private frame 906 is stored in binary format, whereby the private frame may be programmed to inform the media player in the end unit that haptic effects are to be output for the corresponding appended media file 902. In an embodiment, the private frame may be programmed to include synchronization information directly therein as well as the haptic information for each haptic frame. The synchronization information may include time stamp information, whereby the media player reads the data in the private frame and outputs the corresponding haptic effects which are synchronized with the audio and/or video data. In an embodiment, the synchronization information for each frame is stored in metadata, whereby each frame contains time-offsets for each parameterized vibration definition stored in the frame. For example, a particular frame (e.g. Frame A) may have a timestamp set at 600 ms. The synchronization information could instruct that the offset of the haptic effect would begin at 50 ms and 185 ms relative to the beginning of the timestamp for Frame A. Therefore, when Frame A is played, the actuator would be instructed to output the haptic effect (or a predefined characteristics of the haptic effect) at 650 ms and 785 ms, respectively.

In addition, the private frame would include identifying information therein to alert the end device that the private frame includes haptic information therein. Thus, the end unit is configured to search all the private frames for data which identifies the owner of the frame. In an embodiment, the private frame includes an owner-identifier field, such as a null terminated string with a URL containing an email address of the organization responsible for the frame. Additionally and/or alternatively, the owner-identifier field includes a link which refers to the identity of the responsible organization. Upon the end unit positively identifying a private frame belonging to its owner (e.g. Immersion Corporation), the system will further process the frame and use it to haptic processing of the synchronization frame. It should be noted that the private frame may include other means for supplying information which allows the system to identify the tag and is thus not limited to the configurations described above.

The header tag also includes a synchronization frame which carries the haptic information as well as the time stamp information described above. The synchronization frame includes several fields which are used to program the frame. In an embodiment, a field used in the synchronization frame is whether the encoding character set comprises Unicode, ISO-8859-1 or other encoding characters. The synchronization frame can be any of the shown frames in FIG. 9, such as the Lyrics frame 910. Further, the synchronization frame includes a time format field which allows the time stamp unit to be in milliseconds, MPEG frames or the like.

In an example, the synchronization frame can be set to be in the Unicode format, have the haptic event data be placed in the "events" frame and the time stamp format be set to milliseconds. In the example, the first entry in the data field is the entry count given as a string followed by a newline character. Since the null character is used as the sync identifier, the entry count and the data sizes are represented as strings. For each sample, the frame includes a haptic definition frame as well as the call haptic effect frames as discussed above in FIG. 6. In addition, the frame includes the synchronization identifier information, and time stamp information (if needed).

Figure 10:
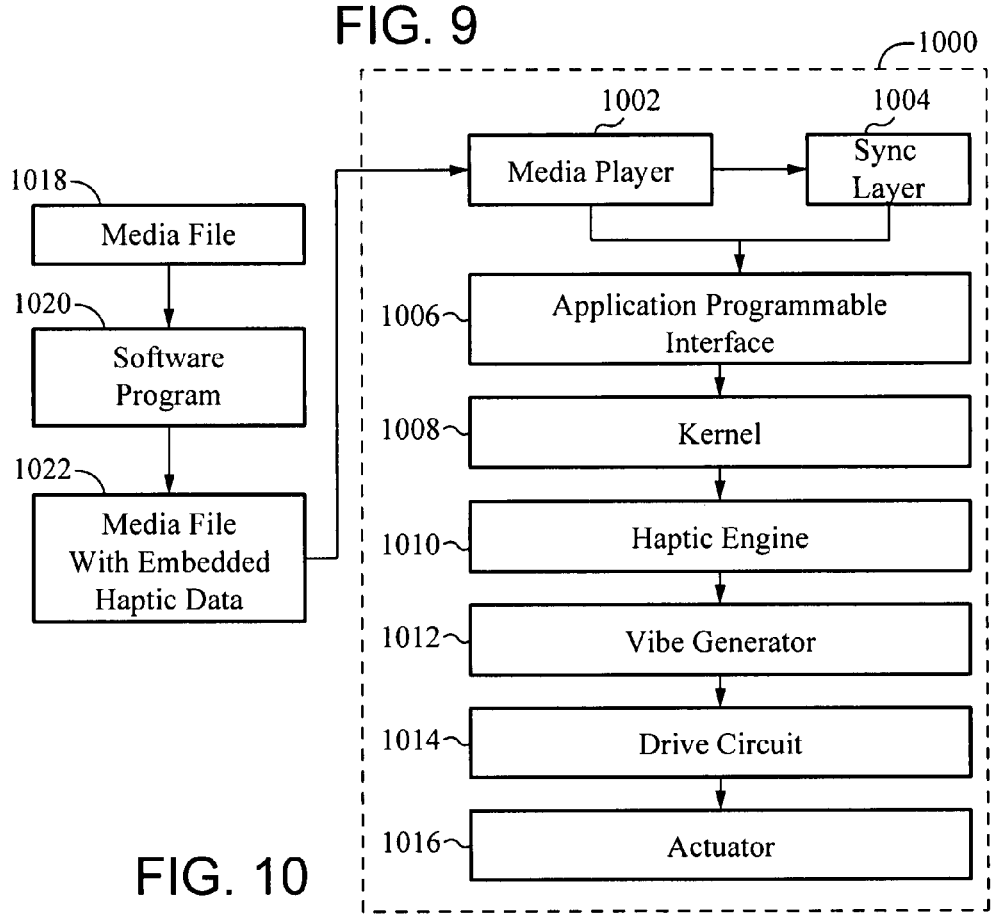
FIG. 10 is a diagram illustrating a block diagram of a system in accordance with an embodiment.

FIG. 10 illustrates a block diagram of the system in accordance with an embodiment using the header tag to provide haptic information. Shown in FIG. 10 is the system 1000 which includes a media player 1002, a synchronization layer 1004, an Application Programmable Interface (API) 1006, a kernel 1008, a haptic playback engine 1010, a vibe generator 1012, an actuator drive circuit 1014, and one or more actuators 1016. It should be noted that the system 1000 is not limited to this configuration and alternative and/or additional components may be used.

As shown in FIG. 10, the media file 1018 is loaded into a software program interface 1020 wherein the media file 1018 is embedded with haptic information as well as identifier and synchronization information within the header tag, as discussed above. The embedding of this information can be done on Immersion's proprietary VibeTonz Studio software or by other appropriate software program. Once the media file is embedded with the synchronizing and haptic information data, the modified media file 1022 can be sent directly to the device 1000 or can be stored in a memory or server for later retrieval. In an embodiment, the modified media file can be stored on a streaming server for streaming to the end device 1000.

Upon being downloaded to the end device 1000, the modified media file 1022 is received by the media player 1002, whereby the media player 1002 identifies whether the file 1022 includes haptic identifier data. In another embodiment, the media file 1022 is streamed to the end device 1000, whereby the header information is retrieved at the beginning of the stream and stored. The stored header information is then processed along with the later received steaming media file to ensure the haptic effects are synchronized with the streamed media. If the file 1022 does not include haptic identifier data, no haptic effect information is relayed to the API 1006. However, if the file 1022 does include haptic identifier data in the private frame, the synchronization layer 1004 reads the synchronization frame and provides the necessary extracted information to the API 1006. The API 1006 initiates haptic effects at the correct time since each haptic frame is a self-contained haptic effect which does not rely on other frames in the synchronization frame. The API 1006 instructs the kernel 1008 to provide the low level commands to the haptic playback engine 1010, whereby the haptic playback engine instructs the vibe generator 1012 to activate the drive circuit 1014 to control and/or amplify the control signal output to the actuator 1016. The actuator 1016 then automatically outputs the instructed haptic effects at the instructed time stamps with the specific haptic effects defined in the synchronization layer. It should be noted that the above steps may be done in any appropriate order and are not limited to the order presented. It should also be noted that additional/alternative steps may be used without departing from the inventive concepts herein.

While embodiments and applications have been shown and described, it would be apparent to those skilled in the art having the benefit of this disclosure that many more modifications than mentioned above are possible without departing from the inventive concepts herein.

What is claimed is:

1. A method comprising:
   receiving a media file having embedded haptic event data in a tag preceding content data in the media file, the haptic event data having time stamp information embedded in one or more frames of the haptic event data;
   synchronizing the embedded haptic event data with the content data in the media file by assigning one or more time stamps to the one or more frames of the haptic event data according to a master time code embedded in the media file, wherein each time stamp is synchronized with a corresponding frame of the content data, wherein each time stamp is embedded within the tag preceding the content data in the media file, wherein at least one time stamp of the one or more time stamps is a sub-time stamp that is an offset of another time stamp within a single frame of the haptic event data; and
   outputting one or more haptic effects via an actuator in a playback device, wherein each outputted haptic effect is synchronized with a corresponding media event of the content data, each media event and corresponding haptic event occurring at a substantially same time stamp, and wherein at least one haptic effect is output at the offset based on an offset parameter indicated within the haptic event data.

2. The method of claim 1, wherein the frame of the embedded haptic event data is in a private frame of the tag.

3. The method of claim 1, wherein the frame of the embedded haptic event data is in a lyrics frame of the tag.

4. The method of claim 1, wherein the content data includes audio data.

5. The method of claim 1, wherein the content data includes video data.

6. The method of claim 1, wherein the embedded haptic event data further comprises a start-time, a magnitude, a frequency, and a duration.

7. The method of claim 1, wherein the media file is stored prior to being received at the playback device.

8. The method of claim 1, wherein the media file is streamed from a source and received by the playback device.

9. The method of claim 1, wherein the master time code comprises one or more time stamps independent of the content data.

10. An apparatus comprising:
    means for receiving a media file having embedded haptic event data in a tag preceding content data in the media file, the haptic event data having time stamp information embedded in one or more frames of the haptic event data;
    means for synchronizing the embedded haptic event data with the content data in the media file by assigning one or more time stamps to the one or more frames of the haptic event data according to a master time code embedded in the media file, wherein each time stamp is synchronized with the master time code, wherein each time stamp is embedded within the tag preceding the content data in the media file, and wherein at least one time stamp of the one or more time stamps is a sub-time stamp that is an offset of another time stamp within a single frame of the haptic event data;

means for outputting one or more haptic effects via an actuator, wherein each haptic effect is associated with each time stamp of the haptic event data, and wherein at least one haptic effect is output at the offset based on an offset parameter indicated within the haptic event data.

11. The apparatus of claim 10, wherein the frame of the embedded haptic event data is in a private frame of the tag.

12. The apparatus of claim 10, wherein the frame of the embedded haptic event data is in a lyrics frame of the tag.

13. The apparatus of claim 10, wherein the content data includes audio data.

14. The apparatus of claim 10, wherein the content data includes video data.

15. The apparatus of claim 10, wherein the media file is in a MP3 format.

16. The apparatus of claim 10, wherein the embedded haptic event data further comprises a start-time, a magnitude, a frequency, and a duration.

17. The apparatus of claim 10, wherein the media file is stored prior to being received at the playback device.

18. The apparatus of claim 10, wherein the media file is streamed from a source and received by the playback device.

19. The apparatus of claim 10, wherein the master time code comprises one or more time stamps independent of the content data.

20. Logic encoded in one or more tangible media for execution by a machine and when executed operable to perform a method, the method comprising:

receiving a media file having embedded haptic event data in a tag preceding content data in the media file, the haptic event data having time stamp information embedded in one or more frames of the haptic event data;

synchronizing the embedded haptic event data with the content data in the media file by assigning one or more time stamps to the one or more frames of the haptic event data according to a master time code embedded in the media file, wherein each time stamp is synchronized with a corresponding frame of the content data, wherein each time stamp is embedded within the tag preceding the content data in the media file, and wherein at least one time stamp of the one or more time stamps is a sub-time stamp that is an offset of another time stamp within a single frame of the haptic event data; and outputting one or more haptic effects via an actuator in a playback device, wherein each outputted haptic effect is synchronized with a corresponding media event of the content data, each media event and the corresponding haptic event occurring at a substantially same time stamp, and wherein at least one haptic effect is output at the offset based on an offset parameter indicated within the haptic event data.

* * * * *